US009620979B2

(12) United States Patent
Waki et al.

(10) Patent No.: US 9,620,979 B2
(45) Date of Patent: Apr. 11, 2017

(54) STORAGE BATTERY CONTROL APPARATUS, STORAGE BATTERY CONTROL METHOD, AND STORAGE BATTERY SYSTEM

(71) Applicant: Panasonic Corporation, Osaka (JP)

(72) Inventors: Yuki Waki, Osaka (JP); Tatsuya Mizobata, Osaka (JP); Minoru Takazawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 306 days.

(21) Appl. No.: 14/374,669

(22) PCT Filed: Nov. 8, 2013

(86) PCT No.: PCT/JP2013/006599
§ 371 (c)(1),
(2) Date: Jul. 25, 2014

(87) PCT Pub. No.: WO2014/076918
PCT Pub. Date: May 22, 2014

(65) Prior Publication Data

US 2015/0008884 A1 Jan. 8, 2015

(30) Foreign Application Priority Data

Nov. 13, 2012 (JP) ................................ 2012-249353

(51) Int. Cl.
*H02J 7/00* (2006.01)
*H02J 7/14* (2006.01)
(Continued)

(52) U.S. Cl.
CPC ................ *H02J 7/007* (2013.01); *H02J 3/32* (2013.01); *H02J 7/0013* (2013.01); *H02J 11/00* (2013.01)

(58) Field of Classification Search
USPC ....... 320/134, 128, 101, 109, 106, 136, 116, 320/127, 137, 138, 162
See application file for complete search history.

(56) References Cited

U.S. PATENT DOCUMENTS

2010/0213763 A1* 8/2010 Boss ........................ H02J 3/14 307/29
2010/0327800 A1* 12/2010 Reineccius ........... H01M 10/44 320/101

(Continued)

FOREIGN PATENT DOCUMENTS

JP 2008-118805 5/2008
JP 2011-200084 10/2011

(Continued)

OTHER PUBLICATIONS

International Search Report issued Jan. 28, 2014 in corresponding International Application No. PCT/JP2013/006599.

*Primary Examiner* — Alexis A Boateng
(74) *Attorney, Agent, or Firm* — Wenderoth, Lind & Ponack, L.L.P.

(57) ABSTRACT

A storage battery control apparatus includes: a storage battery state detection unit which obtains a remaining SOC which is an SOC of a storage battery at the start of a supply and demand control period; an offset power value determination unit which determines an offset power value that is a power value indicating charge or discharge; an adjustment instruction value obtainment unit which obtains an adjustment instruction value indicating a state of charge and discharge of the storage battery; and a charge and discharge control unit which performs control of discharging power (Continued)

from the storage battery to the grid or charging power from the grid to the storage battery, the power having a magnitude of a first power value which is a power value obtained by adding the offset power value to the adjustment instruction power value indicated by the adjustment instruction value.

16 Claims, 11 Drawing Sheets

(51) Int. Cl.
*H02J 3/32* (2006.01)
*H02J 11/00* (2006.01)

(56) References Cited

U.S. PATENT DOCUMENTS

2011/0010018 A1* 1/2011 Haugh ...................... H02J 3/14 700/295
2011/0015799 A1* 1/2011 Pollack ............... B60L 11/1824 700/291
2013/0020997 A1* 1/2013 Iwasawa ............. H01M 10/441 320/116
2013/0030590 A1* 1/2013 Prosser ..................... H02J 3/14 700/295
2013/0057211 A1* 3/2013 Kuribayashi ....... B60L 11/1844 320/109
2013/0082641 A1* 4/2013 Nishibayashi ............ H02J 3/32 320/106
2013/0158727 A1* 6/2013 Park .......................... H02J 7/34 700/286
2014/0015469 A1* 1/2014 Beaston .................... H02J 3/32 320/101
2014/0039709 A1* 2/2014 Steven .................. G06Q 10/06 700/291
2014/0052308 A1 2/2014 Hanafusa
2014/0312847 A1* 10/2014 Chauhdary ......... B60L 11/1816 320/128
2015/0001944 A1* 1/2015 Markowz .................. H02J 3/32 307/66

FOREIGN PATENT DOCUMENTS

JP 2012-100487 5/2012
WO 2013/132872 9/2013

* cited by examiner

Power value
Discharge (+)
0
A
Charge (-)
|A|
t1
D2 D2 D2 D2
D1
901
902
t1 + D1
Time 100b
Storage battery control apparatus
110b
Storage battery state detection unit
130
Offset power value determination unit
120
Control capability determination unit
160
Corrected power value determination unit
150b
Charge and discharge control unit
140
Adjustment instruction value obtainment unit D1
D4
D3
914
913
SOC
SOC2
(SOC1)
0
t1
t1 + D1
Time

STORAGE BATTERY CONTROL APPARATUS, STORAGE BATTERY CONTROL METHOD, AND STORAGE BATTERY SYSTEM

TECHNICAL FIELD

The present invention relates to a storage battery control apparatus which controls a storage battery used in power supply and demand balance control of a grid.

BACKGROUND ART

In order to stably operate the grid, a supply and demand balance control which adjusts a balance between generated power supplied to the grid and load power consumed in the grid is important.

Conventionally, a supply and demand balance control service for the grid is provided using a power generator such as a gas turbine or a gas engine. Recently, consideration is being given to providing the supply and demand control service using a storage battery having a fast response speed to a relatively fast output change and load change of the grid.

In the supply and demand balance control using a power generator, power outputted to the grid is increased or decreased based on a supply power amount traded in the wholesale power market. Conversely, in the supply and demand balance control using a storage battery, a power amount to be supplied to the grid is controlled by charge and discharge of the storage battery. In the case where the supply and demand balance is controlled using a storage battery, charge cannot be performed when a state of charge in the storage battery (hereinafter referred to as SOC) reaches 100% of the storage battery capacity, and discharge cannot be performed when the SOC of the storage battery reaches 0%. In view of this, the SOC needs to be maintained at an appropriate level such that the storage battery avoids being in this state.

For example, Patent Literature 1 discloses a storage battery control apparatus which maintains the SOC of the storage battery used in the supply and demand balance control.

CITATION LIST

Patent Literature

[PTL 1]

Japanese Unexamined Patent Application Publication No. 2011-200084

SUMMARY OF INVENTION

Technical Problem

The present invention provides a storage battery control apparatus capable of appropriately controlling the SOC of the storage battery used in the supply and demand balance control.

Solution to Problem

A storage battery control apparatus according to an aspect of the present invention is a storage battery control apparatus which controls charge and discharge of the storage battery to adjust power supply and demand of a grid in a supply and demand control period, the storage battery control apparatus including: a first obtainment unit configured to obtain a remaining state of charge (SOC) which is an SOC of the storage battery at a start of the supply and demand control period; an offset power value determination unit configured to determine, using a difference between the remaining SOC and a target SOC which is a target value of the SOC of the storage battery at an end of the supply and demand control period, an offset power value which is a power value indicating charge or discharge and is a reference of the charge and discharge of the storage battery in the supply and demand control period; a second obtainment unit configured to obtain an adjustment instruction value which is an instruction value of the charge and discharge of the storage battery and indicates a change amount of a power value from a predetermined reference power value; and a charge and discharge control unit configured to perform control of discharging power from the storage battery to the grid or charging power from the grid to the storage battery, the power having a magnitude of a first power value that is a power value obtained by adding the offset power value to an adjustment instruction power value that is a power value indicated by the adjustment instruction value.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Advantageous Effects of Invention

The present invention makes it possible to control the SOC at an appropriate level while controlling the supply and demand balance of the grid.

Figure 1:
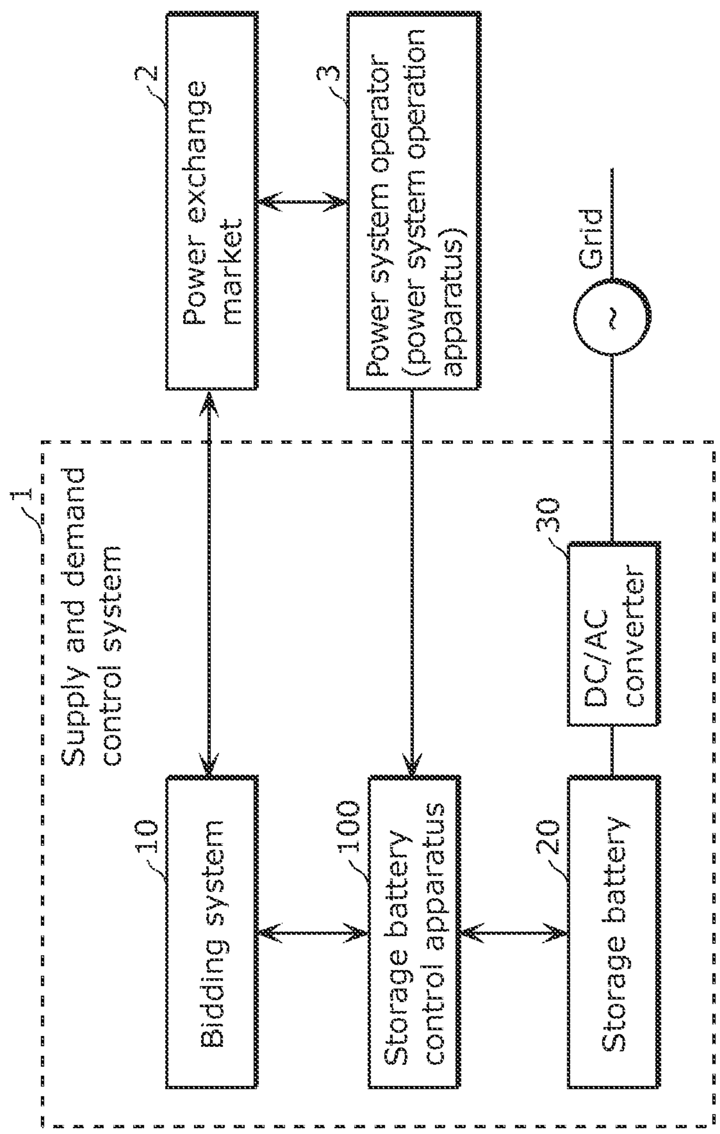
FIG. 1 is a system configuration diagram illustrating a configuration of a supply and demand control system according to Embodiment 1.

DESCRIPTION OF EMBODIMENTS (Underlying Knowledge Forming Basis of the Present Invention)

As described in the Background Art section, when the supply and demand balance is controlled using a storage battery, the SOC of the storage battery needs to be appropriately maintained.

When the SOC is out of a predetermined range and discharge needs to be performed, the storage battery control apparatus in Patent Literature 1 discharges at an amount obtained by multiplying the discharge instruction value by discharge efficiency. Moreover, when the SOC is out of a predetermined range and charge needs to be performed, charge is performed at an amount obtained by multiplying the adjustment instruction value by 1/charge efficiency. In other words, the storage battery control apparatus in Patent Literature 1 supplies, to the grid, power less than the adjustment instruction value when discharge is performed, and consumes power more than the adjustment instruction value when charge is performed.

As described above, when charge and discharge at an amount obtained by multiplying discharge efficiency or 1/charge efficiency by the adjustment instruction value is performed, an error is larger between the adjustment instruction value and the real charge and discharge power in proportion to the size of the instructed charge and discharge power. Therefore, there is a problem that a difference is large between a power curve instructed by the adjustment instruction value and a real charge and discharge power curve.

It should be noted that the supply and demand balance control service can be provided even when there is an error between the power curve instructed by the adjustment instruction value and the real charge and discharge power curve. However, there is a case where revenue obtained by a degree of the error can increase or decrease. For example, in the frequency regulation market in PJM that is one of the regional transmission organizations in the United States, a degree of contribution to stabilizing the grid frequency is evaluated based on a performance score calculated from a weighted sum of the three evaluation values of "degree of delay", "degree of correlation", and "degree of precision" of the real charge and discharge power value with respect to the adjustment instruction value, and then revenue to be obtained is determined.

Furthermore, the storage battery control apparatus in Patent Literature 1 is capable of reducing a change in the SOC by charge and discharge loss and maintaining the current SOC to some extent, but is not capable of regulating the SOC at the most appropriate level. Therefore, when charge and discharge is not equally instructed in the supply and demand balance control, the SOC reaches 100% or 0% of the capacity of the storage battery.

In order to solve the above described problem, a storage battery control apparatus according to an aspect of the present invention is a storage battery control apparatus which controls charge and discharge of the storage battery to adjust power supply and demand of a grid in a supply and demand control period, the storage battery control apparatus including: a first obtainment unit configured to obtain a remaining state of charge (SOC) which is an SOC of the storage battery at a start of the supply and demand control period; an offset power value determination unit configured to determine, using a difference between the remaining SOC and a target SOC which is a target value of the SOC of the storage battery at an end of the supply and demand control period, an offset power value which is a power value indicating charge or discharge and is a reference of the charge and discharge of the storage battery in the supply and demand control period; a second obtainment unit configured to obtain an adjustment instruction value which is an instruction value of the charge and discharge of the storage battery and indicates a change amount of a power value from a predetermined reference power value; and a charge and discharge control unit configured to perform control of discharging power from the storage battery to the grid or charging power from the grid to the storage battery, the power having a magnitude of a first power value that is a power value obtained by adding the offset power value to an adjustment instruction power value that is a power value indicated by the adjustment instruction value.

With this, since the SOC can be controlled at the end of the supply and demand control period, the storage battery control apparatus in the present invention has a lower risk for excessive increase or decrease in the SOC of the storage battery.

Moreover, it is possible that in an aspect of the present invention, in a case where the adjustment instruction power value is a positive value when the adjustment instruction value indicates a power supply instruction to the grid, and the adjustment instruction power value is a negative value when the adjustment instruction value indicates a power consumption instruction in the grid: the offset power value determination unit is configured to determine, as the offset power value, a power value having a polarity identical to the polarity of a power amount obtained by subtracting the target SOC from the remaining SOC; and the charge and discharge control unit is configured to perform control of discharging power having a magnitude of the first power value from the storage battery to the grid when the first power value is a positive value, and perform control of charging power having a magnitude of the first power value from the grid to the storage battery when the first power value is a negative value.

Moreover, it is possible that in an aspect of the present invention, the offset power value determination unit is configured to determine the offset power value, using a power value obtained by dividing a power amount obtained by subtracting the target SOC from the remaining SOC, by a duration of the supply and demand control period.

With this, the SOC at the end of the supply and demand control period can come closer to the target SOC.

Moreover, it is possible that in an aspect of the present invention, the storage battery control apparatus further includes a storage unit configured to store power loss information which is information related to a power loss generated when, in the supply and demand control period, the storage battery is discharged to the grid or the storage battery is charged from the grid, wherein the offset power value determination unit is further configured to determine the offset power value using a power amount corresponding to the power loss indicated by the power loss information.

With this, the risk is reduced that due to the power loss generated in the charge and discharge, the SOC excessively increases or decreases at the end of the supply and demand control period.

Moreover, it is possible that in an aspect of the present invention, the second obtainment unit is configured to obtain the adjustment instruction value at every predetermined period in the supply and demand control period.

Moreover, it is possible that in an aspect of the present invention, the first obtainment unit is further configured to obtain the SOC of the storage battery at the every predetermined period, the storage battery control apparatus further includes a corrected power value determination unit configured to compare the SOC of the storage battery obtained at the every predetermined period with the target SOC, and then determine a corrected power value which is a power value of acceptable error range in the adjustment instruction power value and a power value for reducing a difference of a power amount between the SOC obtained at the every predetermined period and the target SOC, and the charge and discharge control unit is configured to, at the every predetermined period, perform control of discharging power from the storage battery to the grid or charging power from the grid to the storage battery, the power having a magnitude of the first power value obtained by adding the offset power value to the adjustment instruction power value and by further adding the corrected power value.

With this, since a change in the SOC in the supply and demand control period can be reduced, the total charge and discharge power amount in the supply and demand control period can be small, and payment for battery charging and degradation of the storage battery can be reduced.

Moreover, it is possible that in an aspect of the present invention, in a case where the adjustment instruction power value is a positive value when the adjustment instruction value indicates a power supply instruction to the grid, and the adjustment instruction power value is a negative value when the adjustment instruction value indicates a power consumption instruction in the grid: the corrected power value determination unit is configured to determine, as the corrected power value, a power value having a polarity identical to the polarity of a power amount obtained by subtracting the target SOC from the SOC of the storage battery obtained at the every predetermined period; and the charge and discharge control unit is configured to perform control of discharging power having a magnitude of the first power value from the storage battery to the grid when the first power value is a positive value, and perform control of charging power having a magnitude of the first power value from the grid to the storage battery when the first power value is a negative value.

Moreover, it is possible that in an aspect of the present invention, the storage battery control apparatus further includes a control capability determination unit configured to determine a control capability which is largest power of the storage battery and is used in the charge and discharge of the storage battery in the supply and demand control period, wherein the control capability determination unit is configured to: determine the control capability by setting, as an upper limit, power obtained by subtracting the magnitude of the offset power value from largest power that is dischargeable from the storage battery to the grid, when the offset power value indicates discharge from the storage battery; and determine the control capability by setting, as an upper limit, power obtained by subtracting the magnitude of the offset power value from largest power that is chargeable from the grid to the storage battery, when the offset power value indicates charge to the storage battery.

Moreover, it is possible that in an aspect of the present invention, the storage battery control apparatus further includes an SOC prediction unit configured to predict a difference of the SOC of the storage battery at the end of the supply and demand control period, from the SOC of the storage battery at the start of the supply and demand control period, using a previous adjustment instruction value obtained in a previous supply and demand control period, wherein the offset power value determination unit is further configured to determine the offset power value using the difference of the SOC predicted by the SOC prediction unit.

With this, by considering the predictive value of the charge and discharge amount in the supply and demand control period, the SOC of the storage battery at the end of the supply and demand control period can further come closer to the target SOC.

Moreover, it is possible that in an aspect of the present invention, the storage battery control apparatus further includes a price information obtainment unit configured to obtain price information that is information related to benefit from performing the charge and discharge of the storage battery in the supply and demand control period, wherein the offset power value determination unit is configured to determine, as the offset power value, a power value that is smaller as the value of the price indicated by the price information is larger.

With this, revenue from the supply and demand control can be increased.

Moreover, it is possible that in an aspect of the present invention, the first obtainment unit is configured to obtain the adjustment instruction value transmitted from a power system operation apparatus which operates the grid.

Moreover, it is possible that in an aspect of the present invention, the storage battery control apparatus further includes an instruction value determination unit configured to measure a frequency of an AC current of the grid and then determine the adjustment instruction value according to the frequency, wherein the first obtainment unit is configured to obtain the adjustment instruction value from the instruction value determination unit.

Moreover, it is possible that in an aspect of the present invention, the remaining SOC is an actually measured value or an estimated value of the SOC of the storage battery at the start of the supply and demand control period.

Moreover, the storage battery system according to an aspect of the present invention includes a storage battery control apparatus according to any one of the aspects and the storage battery.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Hereinafter, embodiments of the present invention will be described with reference to the drawings. It should be noted that each of the embodiments described below show a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

It should be noted that a power value of power (instantaneous power) to be discharged from the storage battery to the grid is a positive value and a power value of power (instantaneous power) to be charged from the grid to the storage battery is a negative value. Moreover, "power dischargeable from the storage battery to the grid and power chargeable from the grid to the storage battery" will be referred to as "power chargeable and dischargeable from the storage battery".

Embodiment 1

First, an outline of the supply and demand balance control system for providing a supply and demand balance control service will be described. As the supply and demand balance control service, for example, a frequency regulation (FR) service to control power supply and demand using a frequency of AC power in the grid is known.

FIG. 1 is a block diagram illustrating a configuration of a supply and demand control system according to Embodiment 1.

A supply and demand control system includes a bidding system 10, a storage battery control apparatus 100, a storage battery 20, and a DC/AC converter 30.

It should be noted that in the supply and demand control system 1, the storage battery control apparatus 100, the storage battery 20, and the DC/AC converter 30 may be implemented as a single apparatus, and as their respective different apparatuses.

Figure 2:
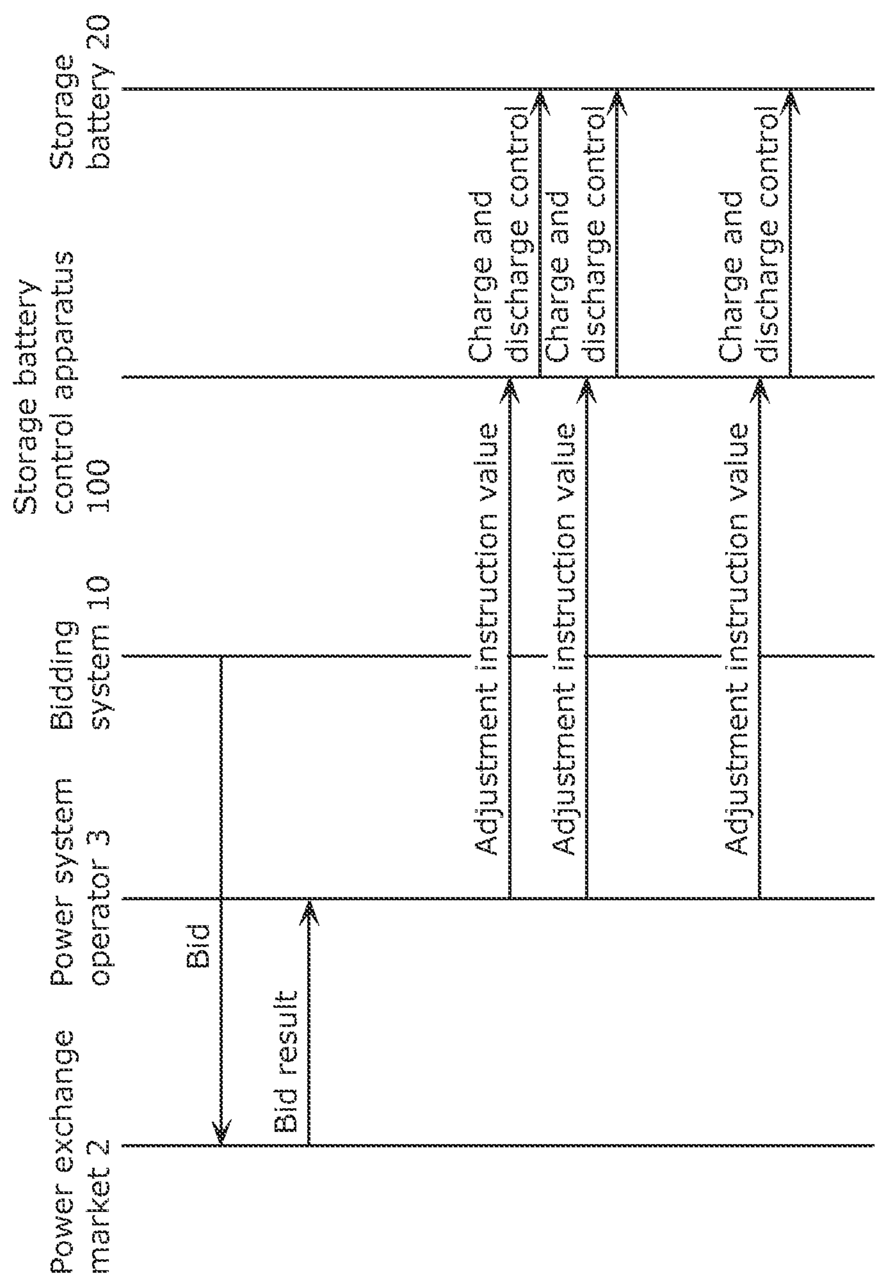
FIG. 2 is a sequence diagram for explaining a procedure of a supply and demand balance control service according to Embodiment 1.

FIG. 2 is a sequence diagram for explaining a procedure of a supply and demand balance control service according to Embodiment 1.

First, a user of the supply and demand control system 1 (hereinafter referred to as a service provider) in advance submits bid information to a power exchange market 2, using the bidding system 10. Specifically, the bid information is information including a service providing period that is a period to provide the supply and demand control service using the storage battery 20, and a control capability that is the largest power used in the supply and demand control service in this service providing period, and the bid price.

The service providing period is a predetermined period of time in which the service provider hopes to provide the supply and demand control service. It should be noted that hereinafter the service providing period is also referred to as a supply and demand control period.

When the largest value of power chargeable and dischargeable from the storage battery 20 is 1 MW, the control capability is arbitrarily determined by the service provider by setting 1 MW as the upper limit. For example, the service provider offers a bid of a value of 0.3 MW as a control capability. Although not illustrated in FIG. 1, each of service providers offers bid information to the power exchange market 2.

The bid price (price for the service) is, for example, set for the length of the service providing period×the control capability. The price for the service (hereinafter also referred to as supply and demand control service price) corresponds to a power amount secured for the supply and demand control service in the service providing period.

A power system operator 3 selects bid information necessary for the supply and demand control of the grid from a plurality of bid information items offered via the bidding system 10 from the power exchange market 2, and then accepts the bid information.

When the service start time of the service providing period designated by the accepted bid information comes, the power system operator 3 (power system operating apparatus) transmits an adjustment instruction value to the storage battery control apparatus 100 of the service provider which offered the bid information. In Embodiment 1, as an example, the adjustment instruction value is a value within a range from −10 to +10. It should be noted that in the present embodiment, the adjustment instruction value is a value which indicates a change rate (adjustment rate) of the power value which is set for the power value of the predetermined charge and discharge power of the storage battery 20 as a reference value.

The storage battery control apparatus 100 performs control of charge and discharge of the storage battery 20, based on the adjustment instruction value transmitted from the power system operator 3 at every predetermined period in the supply and demand control period. Specifically, the storage battery control apparatus 100 discharges from the storage battery 20 to the grid or charges the storage battery 20 from the grid, by transmitting a control instruction to the storage battery 20.

Here, the power value (adjustment instruction power value) of the power that the storage battery 20 charges or discharges based on the adjustment instruction value is represented by the following Expression 1.

$$\text{Bid control capability} \times \text{adjustment instruction value} \div 10 \quad \text{(Expression 1)}$$

For example, when the storage battery control apparatus 100 of the service provider which offered a bid of 0.3 MW as the control capability receives "−0.5" as an adjustment instruction value, the adjustment instruction power value represented by Expression 1 is −0.15 MW. Therefore, the storage battery control apparatus 100 charges the storage battery 20 at 0.15 MW from the grid. Moreover, for example, when the storage battery control apparatus 100 receives "+3" as the adjustment instruction value, the adjustment instruction power value represented by Expression 1 is +0.09 MW. Therefore, the storage battery control apparatus 100 discharges at 0.09 MW from the storage battery 20 to the grid.

The storage battery 20 charges or discharges power according to the control (control instruction) of the storage battery control apparatus 100.

The DC/AC converter 30 converts DC power outputted from the storage battery 20 into AC power, and then outputs the AC power to the grid. Moreover, the DC/AC converter 30 converts AC power inputted from the grid into DC power, and then inputs the DC power to the storage battery 20.

When power of the adjustment instruction power value cannot be discharged because the SOC of the storage battery 20 is low or when power of the adjustment instruction power value cannot be charged because the SOC of the storage battery 20 is high, there is a case where a penalty such as a penalty of only obtaining a lower price for the service than the usual price is imposed.

Next, a storage battery control apparatus 100*a* according to Embodiment 1 to be used as the storage battery control apparatus 100 in FIGS. 1 and 2 will be described in detail.

Figure 3:
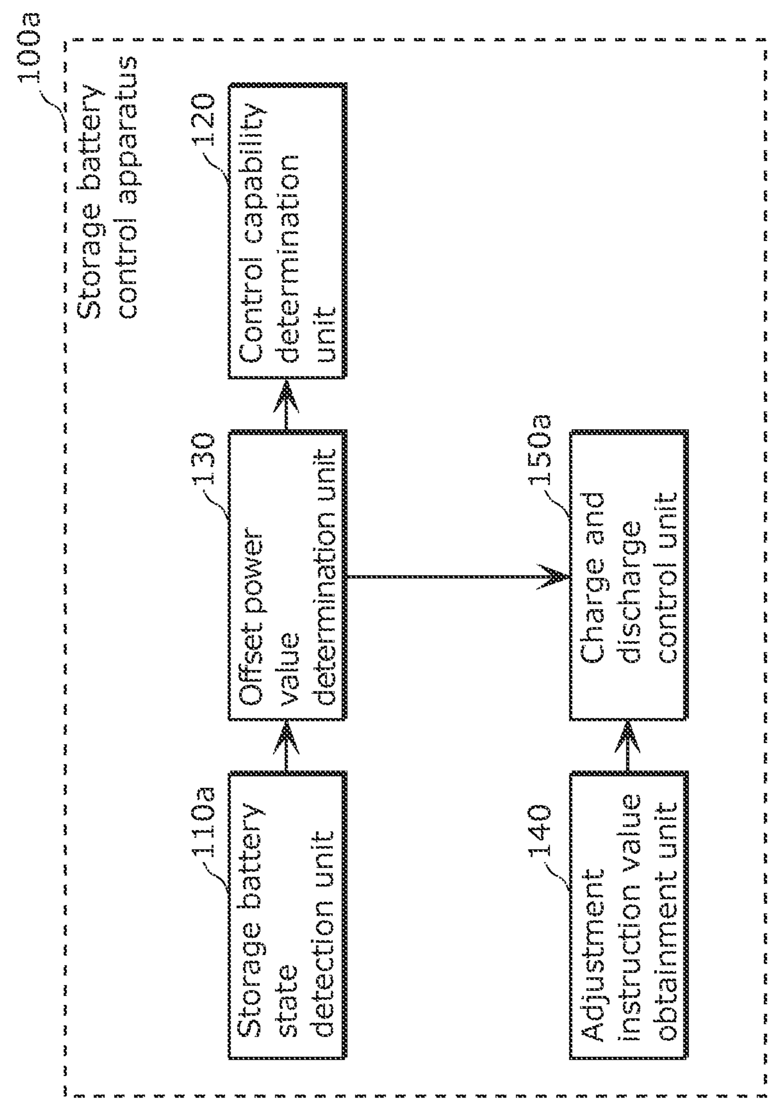
FIG. 3 is a block diagram illustrating a configuration of a storage battery control apparatus according to Embodiment 1.

FIG. 3 is a block diagram illustrating a configuration of the storage battery control apparatus 100*a* according to Embodiment 1.

As illustrated in FIG. 3, the storage battery control apparatus 100*a* includes a storage battery state detection unit 110*a* (first obtainment unit), a control capability determination unit 120, an offset power value determination unit 130, an adjustment instruction value obtainment unit 140 (second obtainment unit), a charge and discharge control unit 150*a*.

The storage battery control apparatus 100*a* is characterized by including the offset power value determination unit 130. Usually, in the storage battery control in the supply and demand balance control, the storage battery 20 performs charge and discharge of power indicated by the adjustment instruction value, by setting, as a reference, a state in which charge and discharge is not performed by the storage battery 20 (power value is 0). In contrast, in the storage battery control of the storage battery apparatus 100*a*, the storage battery 20 performs charge and discharge of power indicated by the adjustment instruction value, by setting, as a reference, a state in which power of the offset power value determined by the offset power value determination unit 130 is charged and discharged.

Figure 4:
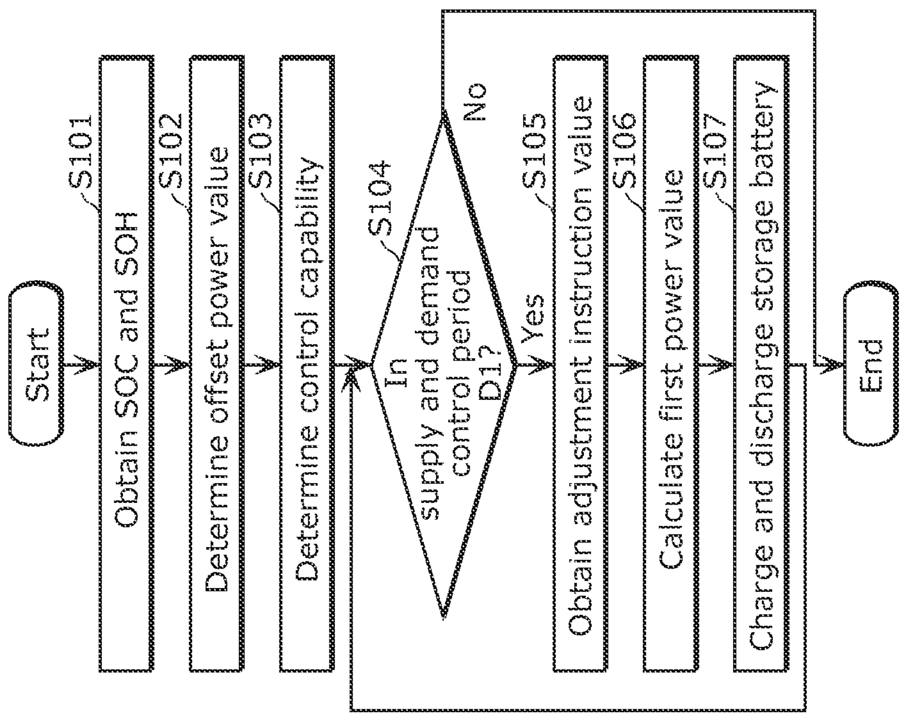
FIG. 4 is a flowchart illustrating an operation of a storage battery control apparatus according to Embodiment 1.

FIG. 4 is a flowchart illustrating an operation of the storage battery control apparatus 100*a*.

The following will describe the operation of the storage battery control apparatus 100*a* according to Embodiment 1 with reference to FIGS. 3. and 4.

First, the storage battery state detection unit 110*a* obtains (i) an actually measured value or an estimated value of the SOC of the storage battery 20 at a start point of time t1 of the supply and demand control period D1, and (ii) a state of health of the storage battery 20 (hereinafter referred to as SOH) (S101 in FIG. 4).

The estimated value of the SOC is, for example, calculated by integrating charge and discharge current from the SOC initial value in a fully charged state. Moreover, the estimated value of the SOC can be calculated using a characteristic curve of a relationship between the SOC and a voltage between terminals of the storage battery 20 that was previously obtained in an experiment.

Next, the offset power value determination unit 130 compares the magnitude of a target SOC (SOC1) that is a target value of the SOC at an end point of time t1+D1 with the magnitude of the SOC detected by the storage battery state detection unit 110*a* (SOC2, remaining SOC), and then calculates, as an offset power value A, power necessary to remove the difference between SOC1 and SOC2 in the supply and demand control period D1 (S102 in FIG. 4). Specifically, the offset power value determination unit 130 determines, as an offset power value, a power value obtained by dividing the power amount subtracted the target SOC from the remaining SOC, by a duration of the supply and demand control period.

In other words, the offset power value A is calculated using the following Expression 2.

$$A = \text{rated capacity of storage battery} \times \text{SOH} \times (\text{SOC2} - \text{SOC1})/D1 \quad \text{(Expression 2)}$$

In Expression 2, in case of SOC1<SOC2, the offset power value A is a positive value. In other words, the offset power value A in this case represents power to be discharged from the storage battery 20. Similarly, in Expression 2, in case of SOC1>SOC2, the offset power value A is a negative value. In other words, the offset power value A in this case represents power to be charged to the storage battery 20.

In Expression 2, in case of SOC1=SOC2, in other words, in case where the SOC at the start point of time of the supply and demand control period D1 is equal to the target SOC, the offset power value A is 0. In Embodiment 1, however, the offset power value determination unit 130 determines the offset power value A by considering a power loss that is a lost power in the supply and demand control period D1 in the storage battery 20 and the DC/AC converter 30.

Specifically, the offset power value A is represented by the following Expression 3 when a power amount corresponding to the power loss is E1.

$$A = \{\text{rated capacity of storage battery} \times \text{SOH} \times (\text{SOC2} - \text{SOC1}) - E1\}/D1 \quad \text{(Expression 3)}$$

In other words, the offset power value determination unit 130 sets the SOC to which the power amount corresponding to the power loss is added, and then determines the offset power value A, for allowing the SOC of the storage battery 20 to be a target SOC at the end of the supply and demand control period D1.

It should be noted that the power loss may be a predetermined value set at a time of design, and may be a value obtained from the actually measured value or the predictive value of the power loss in the past charge and discharge. These information items indicating the power loss are stored in a storage unit (not illustrated in FIG. 3) as power loss information.

After Step S102 the control capability determination unit 120 determines the control capability in the supply and demand control period D1 (S103 in FIG. 4). The upper limit of the control capability is usually determined by the largest power that is chargeable and dischargeable by the storage battery 20 (the largest chargeable rate and the largest dischargeable rate), and efficiency when the largest power is charged and discharged. In the storage battery control apparatus 100*a*, the control capability is also restricted by the offset power value A.

When the offset power value A is a negative value (shows charge), the restriction by the offset power value A is represented by the following Expression 4.

$$\text{Restriction by offset power value } A = \text{largest chargeable rate/efficiency at time of charge at largest chargeable rate} - |A| \quad \text{(Expression 4)}$$

When the offset power value A is a positive value (shows discharge), the restriction by the offset power value A is represented by the following Expression 5.

$$\text{Restriction by offset power value } A = \text{largest dischargeable rate} \times \text{efficiency in discharge at largest chargeable rate} - |A| \quad \text{(Expression 5)}$$

Furthermore, the control capability determination unit 120 may determine the upper limit of the control capability by considering the restriction by the SOC and the restriction by the rating of the DC/AC converter 30.

The restriction by the rating of the DC/AC converter 30 is represented by the following Expression 6.

$$\text{Restriction by rating of DC/AC converter} = \text{rating of DC/AC converter} - |A| \quad \text{(Expression 6)}$$

The restriction by the SOC is represented by the following Expression 7.

$$\text{Restriction by SOC} = \min(\text{rated capacity of storage battery} \times \text{SOH} \times \text{SOC2}/D1 \times \text{efficiency at time of discharge at largest dischargeable rate, rated capacity of storage battery} \times \text{SOH} \times (1 - \text{SOC2})/D1/\text{efficiency at time of charge at largest chargeable rate} \quad \text{(Expression 7)}$$

As described above, the upper limit of the control capability is the smallest value of the restriction by the offset power value A represented by Expression 4 or Expression 5, the restriction by the rating of the DC/AC converter 30 represented by Expression 6, and the restriction by the SOC represented by Expression 7.

After Step S103, until the supply and demand control period D1 ends (Yes in S104 in FIG. 4), the adjustment instruction value obtainment unit 140 obtains an adjustment instruction value at every predetermined time interval D2 that is sufficiently short (S105 in FIG. 4).

For example, the adjustment instruction value obtainment unit 140 obtains an adjustment instruction value every several second. The adjustment instruction value in Embodiment 1 is a value which indicates a ratio to the control capability as described above. However, the adjustment instruction value is not limited to this.

It should be noted that in Embodiment 1, the adjustment instruction value is transmitted from the power system operator 3. However, the storage battery control apparatus 100*a* may determine the adjustment instruction value. For example, the storage battery control apparatus 100*a* may include an adjustment instruction value determination unit which measures a frequency of the AC current of the grid and then determines an adjustment instruction value according to the measured frequency, and the adjustment instruction value obtainment unit 140 may obtain the adjustment instruction value determined by the adjustment instruction value determination unit.

Specifically, the adjustment instruction value determination unit measures a frequency of the AC current at every time interval D2 at a measurement point of the grid in the supply and demand control system 1. In a predetermined table, a difference between the measured frequency and the reference frequency is associated with the adjustment instruction value corresponding to the difference. Here, the adjustment instruction value is, for example, a value which indicates a ratio to the control capability (percentage).

After Step S105, the charge and discharge control unit 150*a* calculates a power value obtained by adding the offset power value A to the adjustment instruction power value corresponding to the adjustment instruction value (hereinafter referred to as the first power value) (S106 in FIG. 4). Subsequently, the charge and discharge control unit 150*a* causes the storage battery 20 to charge and discharge power of the calculated first power value (S107 in FIG. 4). The first power value is, for example, calculated using the following Expression 8.

$$\text{First power value}=\text{adjustment instruction power value}+\text{offset power value } A \quad \text{(Expression 8)}$$

In Embodiment 1, when the first power value is a positive value, the charge and discharge control unit 150*a* performs control of discharging power having a magnitude of the first power value from the storage battery 20 to the grid. Moreover, when the first power value is a negative value, the charge and discharge control unit 150*a* performs control of charging power having a magnitude of the first power value from the grid to the storage battery 20.

Figure 5:
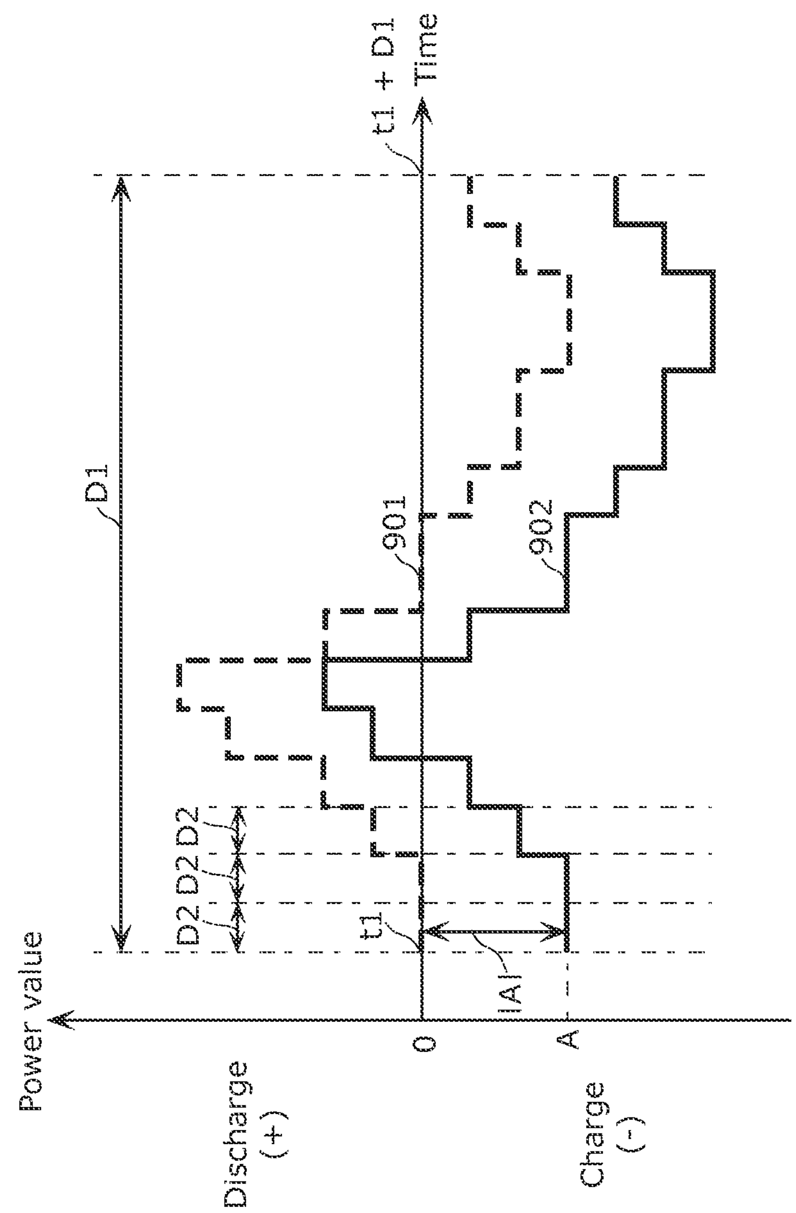
FIG. 5 is a diagram schematically illustrating an adjustment instruction power value, an offset power value, and a first power value according to Embodiment 1.
Figure 6:
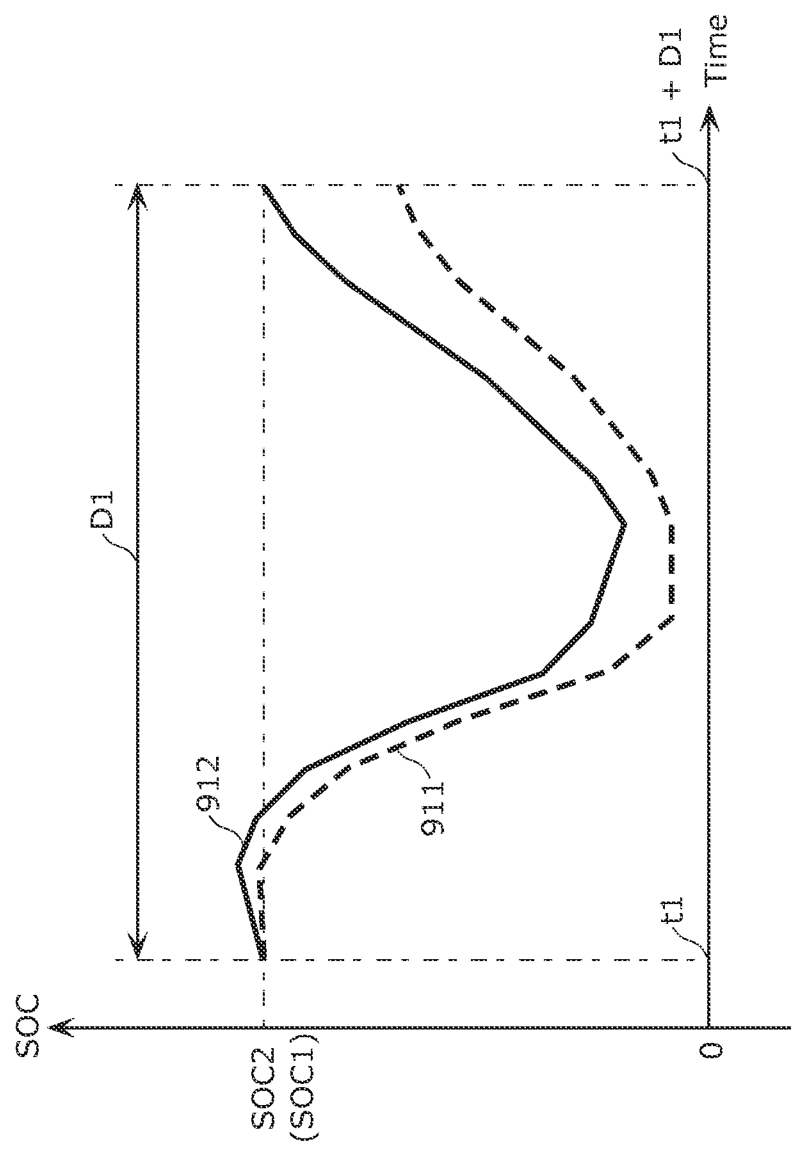
FIG. 6 is a diagram schematically illustrating a change in SOC according to Embodiment 1.

FIG. 5 is a diagram schematically illustrating an adjustment instruction power value, an offset power value, and a first power value according to Embodiment 1. FIG. 6 is a diagram schematically illustrating a process of the SOC at this time.

As illustrated in FIG. 5, a first power value 902 is a power value obtained by adding the offset power value A to an adjustment instruction power value 901.

The adjustment instruction power value 901 indicates an adjustment instruction power value corresponding to the adjustment instruction value obtained at every time interval D2 in the power supply and demand control period D1. In FIG. 5, the offset power value A is a negative value (a value indicating charge).

It should be noted that FIG. 5 illustrates an ideal example of the case where in the supply and demand control period D1, the total charge amount from the grid to the storage battery 20 and the total discharge amount from the storage battery 20 to the grid that are instructed by the adjustment instruction power value are equal to each other.

In FIG. 6, a graph 911 (dashed line) illustrates a process of the SOC of the storage battery 20 to which the conventional storage battery control (the offset power value is 0 in Expression 8) which does not add the offset power value A is applied. In FIG. 6, the case where SOC1=SOC2, that is, the case where the SOC at the start point of time of the supply and demand control period D1 is equal to the target SOC is illustrated. As illustrated in the graph 911, the SOC at the end point of time of the supply and demand control period D1 decreases by the power loss with respect to the SOC at the start point of time of the supply and demand control period D1. As described above, based on the adjustment instruction power value, in the supply and demand control period D1, the total charge amount is equal to the total discharge amount.

Meanwhile, a graph 912 (solid line) illustrates a process of the SOC of the storage battery 20 to which the control of the storage battery control apparatus 100*a* is applied. As described above, the storage battery control apparatus 100*a* determines, using Expression 3, the offset power value A, and then controls the storage battery 20 based on Expression 8. Therefore, the power amount obtained by the offset power value A×the supply and demand control period D1 (the power amount corresponding to the power loss) is charged in the supply and demand control period D1. Therefore, the SOC at the end of the supply and demand control period D1 is equal to SOC2 (=SOC1) that is the SOC at a start point of time t1 of the supply and demand control period D1.

As described above, the storage battery control apparatus 100*a* determines an offset power value using (i) a difference between SOC 1 that is the target SOC and SOC2 that is the SOC at a start point of time of the supply and demand control period D1 and (ii) the power amount corresponding to the power loss, and performs an instruction of charge and discharge at a value obtained by adding the offset power value to the adjustment instruction value. Therefore, the risk is reduced that the SOC of the storage battery 20 excessively increases or decreases due to the power loss. In other words, since the possibility of falling into the state in which the supply and demand control service such as the SOC of 100% or 0% cannot be provided (the state in which charge or discharge cannot be performed according to the adjustment instruction value) is low, the most appropriate SOC is maintained.

It should be noted that the estimated value of the SOC of the storage battery 20 at a start point of time t1 in the supply and demand control period D1 may be calculated as a predictive value, based on the SOC at time t2 before the start point of time and the predictive value of the charge and discharge amount from time t2 to t1.

It should be noted that the target SOC (SOC1) may be 50%, or a fixed value previously set at a little more than 50%, considering the ratio of average charge and discharge loss.

Moreover, in Embodiment 1, as described above, in the supply and demand control period D1, the total charge amount from the grid to the storage battery 20 and the total discharge amount from the storage battery 20 to the grid that are indicated by the adjustment instruction power value are equal to each other. Actually, however, the total charge amount and the total discharge amount are different from each other, depending on the supply and demand control period. In this case, in Expression 2 or Expression 3, furthermore, it is possible to consider a difference (increase and decrease amount) between (i) the SOC of the storage battery 20 at the start of the supply and demand control period D1 and (ii) the SOC of the storage battery 20 at the end of the supply and demand control period D1.

In other words, the storage battery control apparatus 100*a* may further include an SOC prediction unit which predicts the difference of the SOC of the storage battery 20 at the end of the supply and demand control period D1 from the SOC of the storage battery 20 at the start of the supply and demand control period D1, using the adjustment instruction value obtained in the supply and demand control period in which the supply and demand control service is provided before the supply and demand control period D1. In this case, the offset power value determination unit 130 determines an offset power value, using at least the difference between SOC2 (remaining SOC) and SOC1 (target SOC) and the difference of the SOC predicted by the SOC prediction unit.

For example, when the time period of the day in which the most power of the grid is used is the supply and demand control period, the total discharge amount tends to be larger than the total charge amount in the supply and demand control period. The SOC prediction unit predicts the difference of the SOC based on an actual value of the adjustment instruction value obtained in the supply and demand control period of the supply and demand control service in the past.

Specifically, in the supply and demand control period D1 in which a decrease of about 10% in the SOC is predicted, the offset power value determination unit 130 determines, as the offset power value A, a power value obtained by further subtracting (rated capacity of the storage battery×SOH×a decrease of SOC (10%)/D1) from the right side of Expression 2 or Expression 3. Moreover, for example, in the supply and demand control period D1 in which an increase of about 10% in the SOC is predicted, the offset power value determination unit 130 determines, as the offset power value A, a power value obtained by further adding (rated capacity of the storage battery×SOH×an increase of SOC (10%)/D1) to the right side of Expression 2 or Expression 3.

As described above, by considering the predictive value of the charge and discharge amount in the supply and demand control period D1, the SOC at the end of the supply and demand control period D1 can come further closer to the target SOC. It should be noted that the SOC prediction unit may predict the difference of the SOC using not only the adjustment instruction value but also the charge and discharge efficiency (the above described power loss).

It should be noted that in the supply and demand control system 1, there may be a plurality of the storage batteries 20, the DC/AC converters 30, and the storage battery control apparatuses 100 (storage battery control apparatuses 100*a*), and each of these may exist in a plurality of places in a dispersed manner.

Embodiment 2

As described in Embodiment 1, according to the storage battery control apparatus 100*a*, the SOC can come closer to the target SOC using the offset power value A.

In the supply and demand control period D1, it is desirable that the SOC comes linearly closer to the target SOC or the SOC comes closer to the target SOC while a change of the SOC is as small as possible. This is because in this case, the total charge and discharge power amount of the storage battery 20 in the supply and demand control period D1 is small, thus making it possible to reduce a cost of charging the storage battery 20 (utility rate) and degradation of the storage battery 20 due to charge and discharge.

Moreover, when the change of the SOC in the supply and demand control period D1 is small, the SOC is difficult to reach 100% or 0% even if the control capability is set to be large. Therefore, the restriction of the control capability is eased.

However, the adjustment instruction value and the power loss are not constant in the supply and demand period D1. Therefore, in the supply and demand control period D1, the change of the SOC is large, meaning that the SOC comes close to the target SOC by repeating a significant deviation from the target charge amount and then an approach to the target SOC.

In Embodiment 2, even in this case, a storage battery control apparatus capable of reducing a change of the SOC in the supply and demand control period D1 will be described. Moreover, as similarly to Embodiment 1, in the supply and demand control period D1, the total charge amount from the grid to the storage battery 20 and the total discharge amount from the storage battery 20 to the grid that are indicated by the adjustment instruction power value are equal to each other. Moreover, as similarly to Embodiment 1, the predicative value of the power loss and the actual power loss are equal to each other, and the offset power value A is determined using Expression 3.

Figure 7:
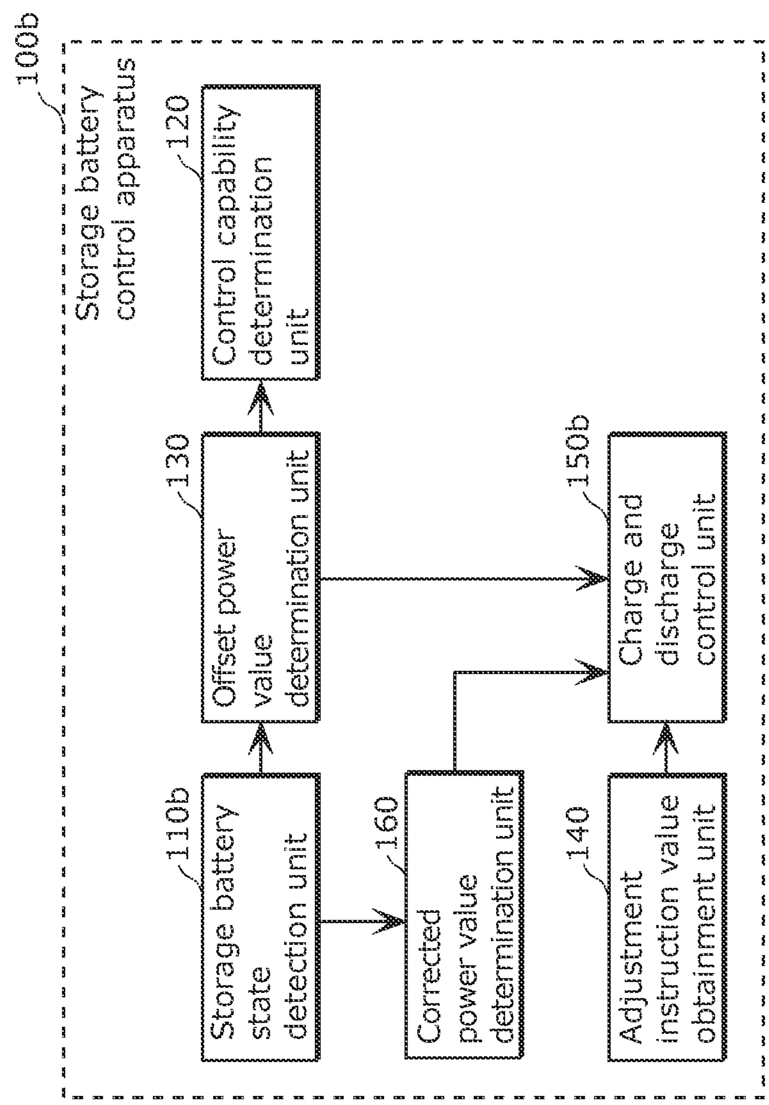
FIG. 7 is a block diagram illustrating a configuration of a storage battery control apparatus according to Embodiment 2.

FIG. 7 is a block diagram illustrating a configuration of the storage battery regulation apparatus 100*b* according to Embodiment 2. It should be noted that in FIG. 7, the same reference signs are assigned to structural elements identical to those in FIG. 3. Therefore, a description thereof will be omitted.

The storage battery control apparatus 100*b* is different from the storage battery control apparatus 100*a* in the operation of a storage battery state detection unit 110*b* and a charge and discharge control unit 150*b*. Moreover, the storage battery control apparatus 100*b* is different from the storage battery control apparatus 100*a* in that the storage battery control apparatus 100*b* includes a corrected power value determination unit 160.

The storage battery state detection unit 110*b* obtains an actual value or an estimated value of the SOC of the storage battery 20 at a start point of time t1 of the supply and demand control period D1 and the degree of degradation (SOH) of the storage battery 20, and obtains the SOC of the storage battery 20 at every predetermined time interval D2 in the supply and demand control period D1.

The corrected power value determination unit 160 compares the SOC (SOC3) obtained at every predetermined time interval D2 by the storage battery state detection unit 110*b* and the target SOC of the SOC (SOC1), and then determines a corrected power value that is a power value which reduces a difference between SOC3 and SOC1 within a range of power values in the error portion allowable with respect to the change amount of the power value indicated by the adjustment instruction value (hereinafter referred to as allowable error power value). The allowable error power value includes a fixed value, a ratio to the offered control capability (for example, within 2% with respect to the control capability), and a value which changes in proportion to the adjustment instruction value.

The corrected power value is, for example, represented by the following Expression 9 when SOC3 is less than SOC1.

$$\text{Corrected power value} = -\min(\text{rated capacity of storage battery} \times \text{SOH} \times |\text{SOC3} - \text{SOC1}|/D2,\ |\text{allowable error power value}|) \quad \text{(Expression 9)}$$

Moreover, the corrected power value is, for example, represented by the following Expression 10 when SOC3 is no less than SOC1.

$$\text{Corrected power value} = \min(\text{rated capacity of storage battery} \times \text{SOH} \times |\text{SOC3} - \text{SOC1}|/D2,\ |\text{allowable error power value}|) \quad \text{(Expression 10)}$$

It should be noted that the corrected power value may be determined by considering a power loss that is a loss of power generated in the storage battery 20 and the DC/AC converter 30 in the time interval D2.

The charge and discharge control unit 150*b* calculates the first power value by adding an offset power value determined by the offset power value determination unit 130, an adjustment instruction power value which corresponds to the adjustment instruction value obtained by the adjustment instruction value obtainment unit 140, and a corrected power value determined by the corrected power value determination unit 160. The first power value is, for example, calculated using the following Expression 11.

First power value=adjustment instruction power value+offset power value+corrected power value (Expression 11)

Figure 8:
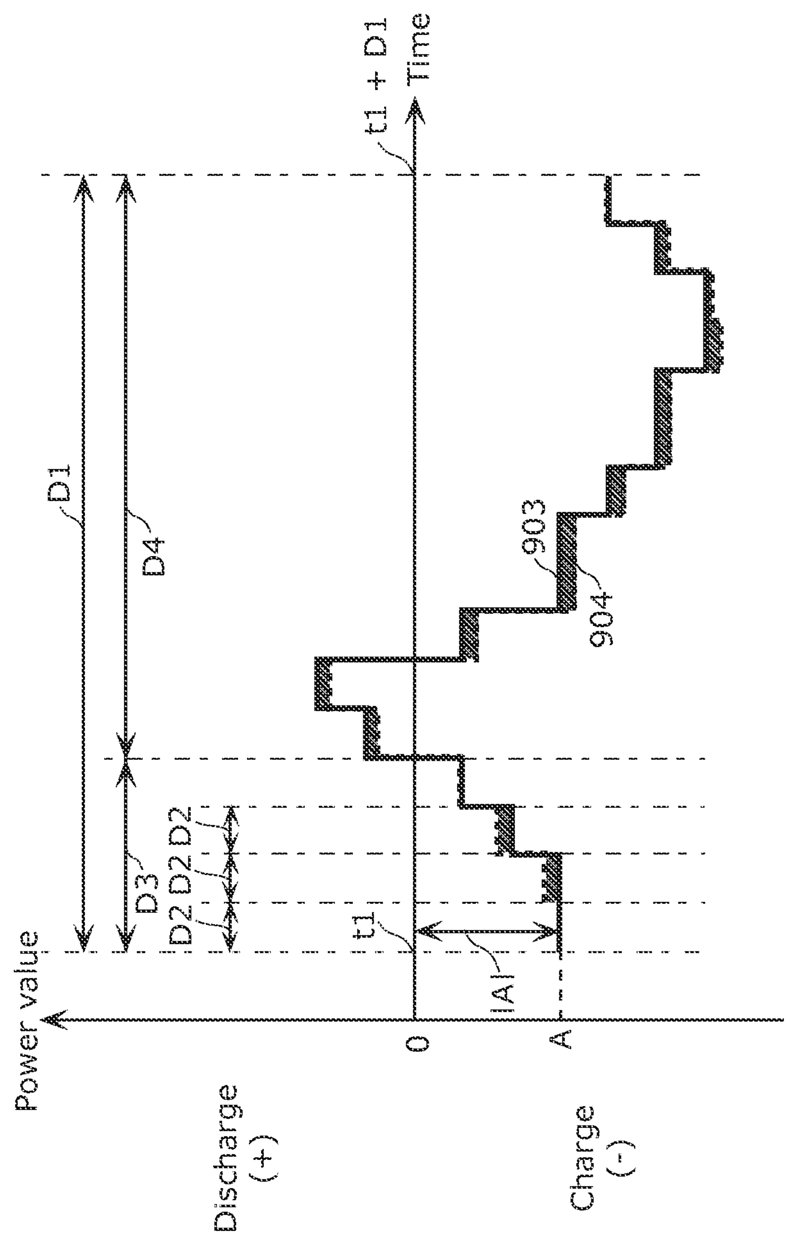
FIG. 8 is a diagram schematically illustrating a first power value according to Embodiment 1 and a first power value according to Embodiment 2.
Figure 9:
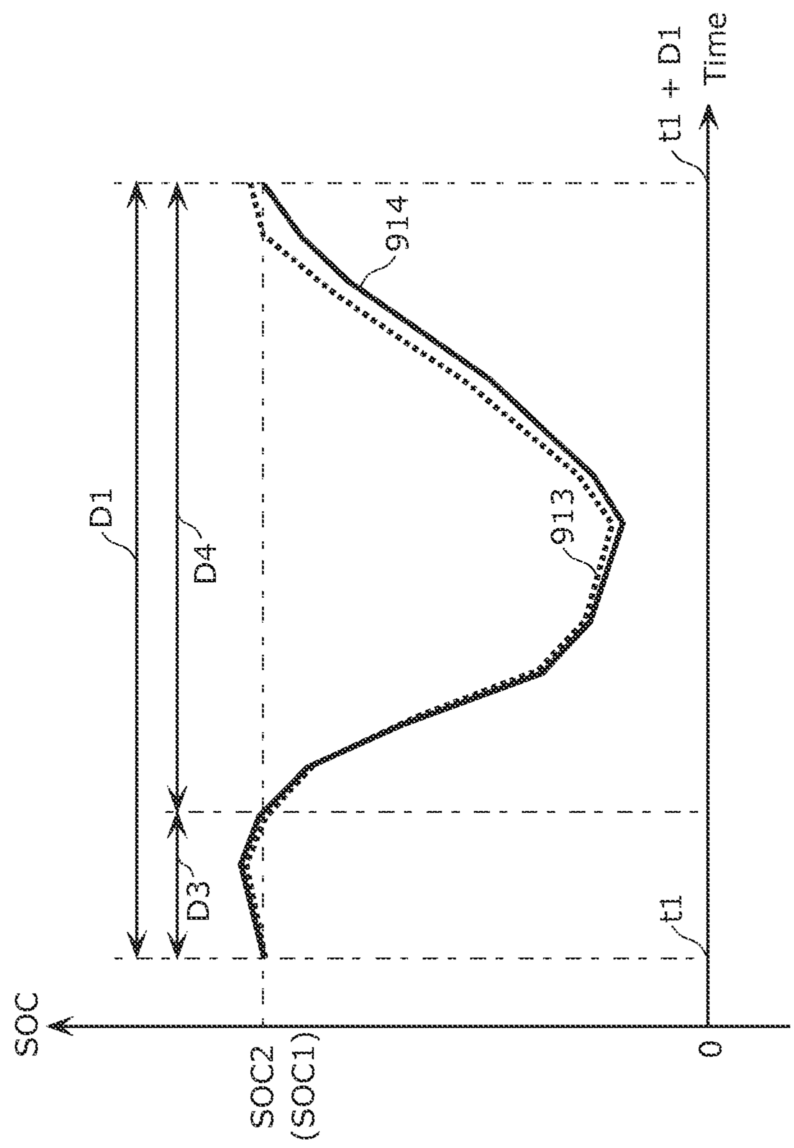
FIG. 9 is a diagram schematically illustrating a change in SOC according to Embodiment 2.

FIG. 8 is a diagram schematically illustrating a first power value 903 according to Embodiment 1 that is represented by Expression 8 and a first power value 904 according to Embodiment 2 that is represented by Expression 11. FIG. 9 is a diagram schematically illustrating a process of the SOC at this time.

A period D3 illustrated in FIG. 8 is a period in which SOC3 is no less than SOC1. In the period D3, the corrected power value is a positive value based on Expression 10. in other words, in the period D3, the first power value 904 is a value obtained by offsetting in a discharge direction compared with the first power value 903 by the corrected power value (diagonal hatched portion in FIG. 8).

Meanwhile, a period D4 illustrated in FIG. 8 is a period in which SOC3 is less than SOC1. In the period D4, the corrected power value is a negative value as represented by Expression 9. in other words, in the period D4, the first power value 904 is a value obtained by offsetting in a charge direction compared with the first power value 903 by the corrected power value (diagonal hatched portion in FIG. 8).

In FIG. 9, a graph 914 (solid line) illustrates a process of the SOC of the storage battery 20 to which the storage battery control of the storage battery control apparatus 100*a* is applied. As illustrated in the graph 914, the SOC at the end of the supply and demand control period D1 and the target SOC are the same to each other. However, the difference between the SOC in the supply and demand control period D1 and the target SOC (a change amount of the SOC with respect to the target SOC) tends to be slightly large.

Meanwhile, a graph 913 (dashed line) illustrates a process of the SOC of the storage battery 20 to which the control of the storage battery control apparatus 100*b* is applied. As illustrated in the graph 913, a gap of the SOC at the end of the supply and demand control period D1 from the target SOC is slightly larger than the gap in the graph 914. However, the difference between the SOC in the supply and demand control period D1 and the target SOC is smaller than the difference in the graph 914. In other words, the storage battery control apparatus 100*b* is capable of reducing a change of the SOC in the supply and demand control period D1 by adding the corrected power value.

As described above, the storage battery control apparatus 100*b* determines, along with the offset power value, a corrected power value that is a power value of the error portion allowable in the adjustment instruction power value and a power value for reducing a difference of power amount between the SOC of the storage battery 20 obtained at every time interval D2 and the target SOC. Then, the storage power control apparatus 100*b* charges and discharges the storage battery 20 according to a power value obtained by adding an adjustment instruction power value indicated by the adjustment instruction value, an offset power value, and a corrected power value.

With this, since a change in the SOC in the supply and demand regulation period D1 can be reduced and the total charge and discharge power amount of the storage battery 20 in the supply and demand regulation period D1 can be small, the utility rate for charging the storage battery 20 and degradation of the storage battery 20 due to charge and discharge can be reduced.

Moreover, when the change of the SOC in the supply and demand control period D1 is small, the SOC is difficult to reach 100% or 0% even when the control capability is set to be large. In other words, the storage battery control apparatus 100*b* makes it possible to ease the restriction of the control capability.

Embodiment 3

When the storage battery control is performed using the offset power value A in the supply and demand control service, as described in Embodiment 1, the upper limit of the control capability is restricted as represented by Expression 4 and Expression 5. Here, for example, since a larger profit can be obtained by bidding a control capability which is as large as possible in the period in which the price for the supply and demand control service is large, it is desirable that the magnitude of the offset power value is small and the upper limit value of the control capability is large.

Embodiment 3 will describe an example of the case where the offset power value A is adjusted according to the price for the supply and demand control service.

Figure 10:
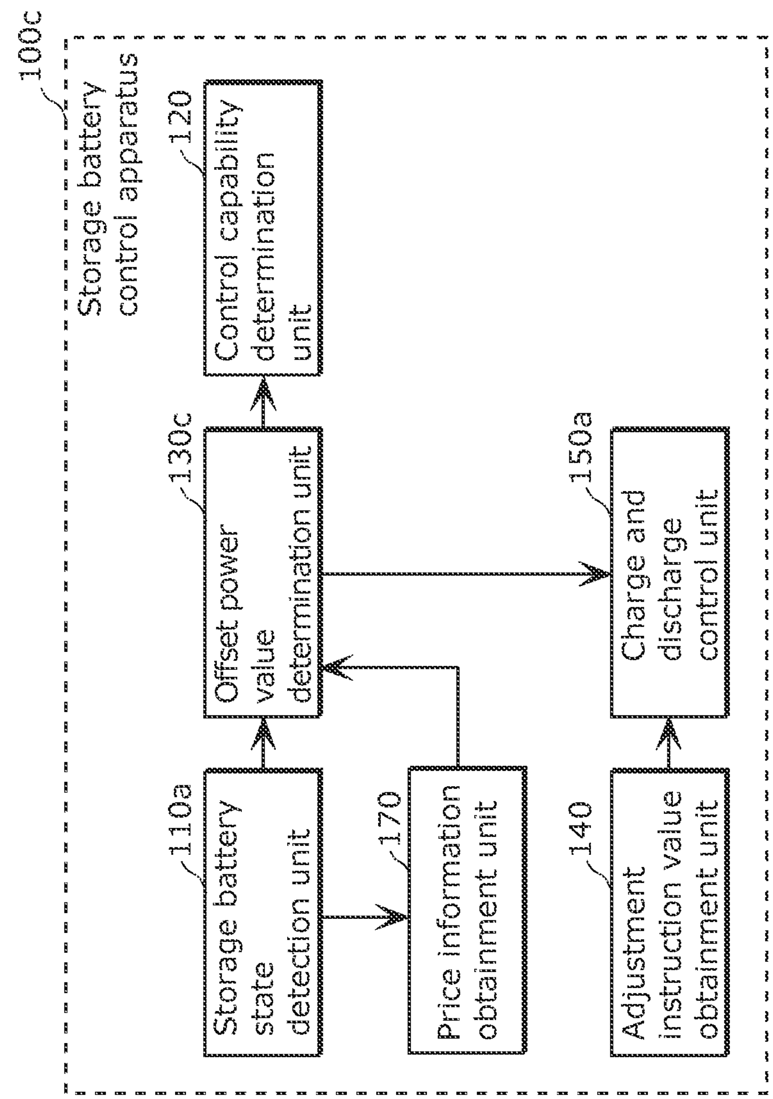
FIG. 10 is a block diagram illustrating a configuration of a storage battery control apparatus according to Embodiment 3.

FIG. 10 is a block diagram illustrating a configuration of a storage battery control apparatus 100*c* according to Embodiment 3. It should be noted that in FIG. 10, the same reference signs are assigned to structural elements identical to those in FIG. 3. Therefore, a description thereof will be omitted.

The storage battery regulation apparatus 100*c* is different from the storage battery control apparatus 100*a* in the operation of an offset power value determination unit 130*c*. Moreover, the storage battery control apparatus 100*c* is different from the storage battery control apparatus 100*a* in that the storage battery control apparatus 100*c* includes a price information obtainment unit 170.

The price information obtainment unit 170 obtains price information related to the supply and demand control service in the supply and demand control period D1. The price information is, for example, information which indicates the value of the price (supply and demand control service price) obtained by providing the supply and demand control service in the supply and demand control period D1.

It should be noted the price information can be obtained from the power exchange market 2 and the like. However, when the price information cannot be obtained, the price information obtainment unit 170 performs prediction. A regression analysis, for example, is used in the prediction.

The offset power value determination unit 130*c* determines an offset power value based on (i) an actually measured value or an estimated value of the SOC of the storage battery 20 at a start point of time t1 of the supply and demand control period D1 from the storage battery state detection unit 110*a*, and (ii) price information from the price information obtainment unit 170.

In Embodiment 3, an offset power value A' is determined using a price information index $\alpha$ ($0<\alpha\leq 1$) determined based on price information and using the following Expression 12.

$$\text{Offset power value } A'=\text{rated capacity of storage battery}\times\text{SOH}\times\alpha\times(\text{SOC1}-\text{SOC2})/D1 \quad \text{(Expression 12)}$$

The price information index $\alpha$ is an index which is smaller as the supply and demand control service price is higher, and is larger as the supply and demand control service price is lower.

Figure 11:
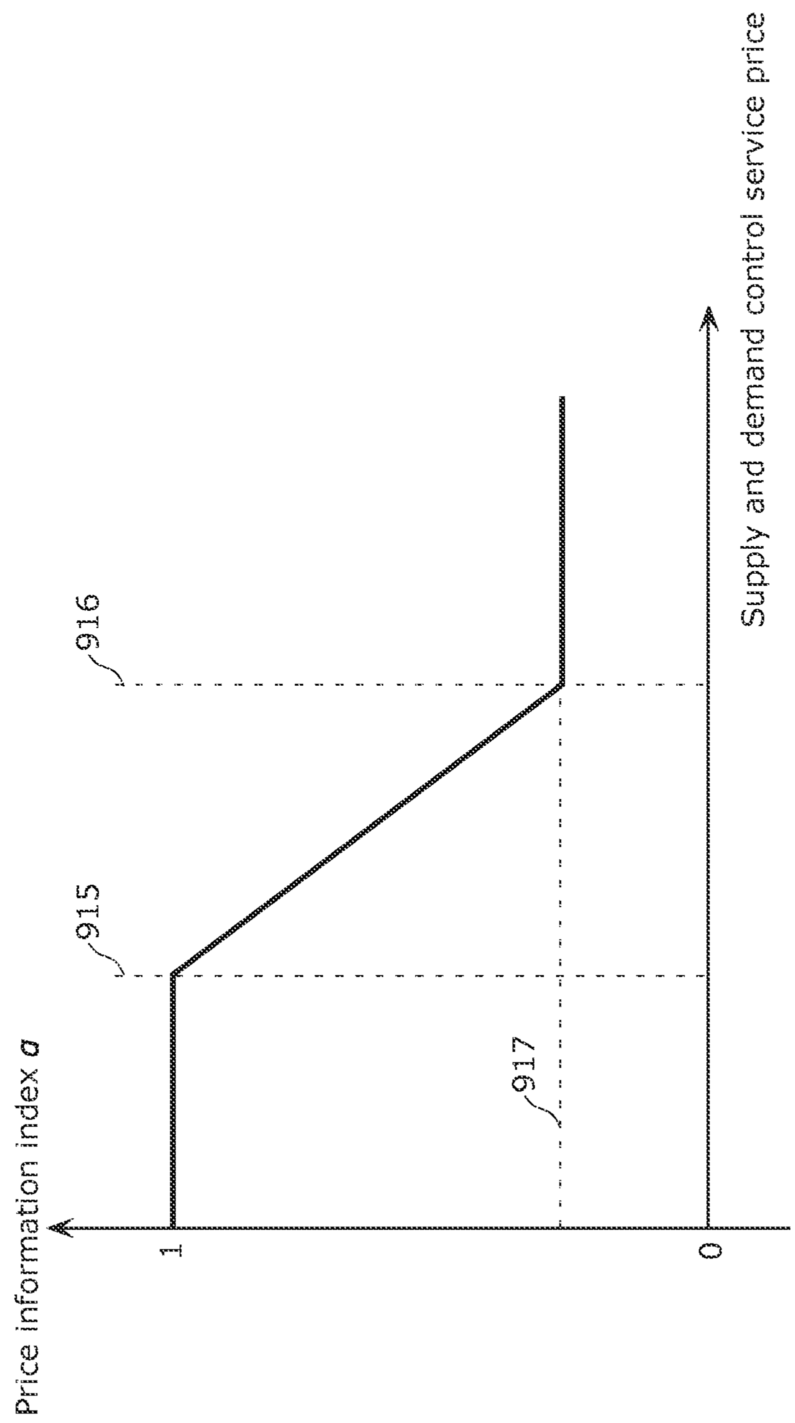
FIG. 11 is a diagram for explaining a price information coefficient according to Embodiment 3.

In Embodiment 3, the price information index $\alpha$ is provided by a function regarding the supply and demand control service price as illustrated in FIG. 11.

As illustrated in FIG. 11, the price information index α is α=1 when the supply and demand control service price is no more than a threshold 915. Moreover, the price information index α is α=the price information index lower limit 917 when the supply and demand control service price is no less than a threshold 916. The price information index α linearly decreases in conjunction with an increase of the supply and demand control service price when the supply and demand control service price is more than a threshold 915 and less than a threshold 916.

When the supply and demand control service is provided, for example, the utility rate (power purchase price) charged on the power to be charged from the grid to the storage battery 20 at the time of charge, and a depreciation cost of the supply and demand control system 1 (system depreciation cost) when the supply and demand control service is provided are generated as spending. As the threshold 915, a supply and demand service price (for example, system depreciation cost) is used which is a break-even point indicating whether or not a profit is obtained in comparison between the spending and the supply and demand control service price.

When the supply and demand control service price is no more than 915, a profit is unlikely to be realized. Therefore, the supply and demand control system 1 does not have to actively provide the supply and demand control service. In this case, therefore, securing the magnitude of the offset power value is prioritized over securing the upper limit of the control capability. Therefore, α=1.

Moreover, as the threshold 916, a supply and demand service price (for example, average of the supply and demand service prices) is used which makes it possible to obtain a relatively large profit by providing the supply and demand control service.

When the supply and demand control service price is no less than 916, a relatively large profit is unlikely to be realized. Therefore, the supply and demand control system 1 needs to actively provide the supply and demand control service. In this case, therefore, securing the upper limit of the control capability is prioritized over securing the magnitude of the offset power value. Therefore, α=a price information index lower limit 917.

The price information index lower limit 917 may, for example, be determined based on the magnitude of the offset power value necessary to be nearly equal between the SOC of an end point of time t1+D1 and the SOC of a start point of time t1. With this, a further change of the capacity can be reduced at the end point of time t1 D1 of the supply and demand control period D1.

It should be noted that FIG. 11 is an example and the price information index α may be determined according to specifications of the supply and demand control system 1.

It should be noted that the price information index α may be determined based on the power purchase price. It should be noted that the price information index α may be determined so that the magnitude of the offset power value is larger as the power purchase price is lower, and the magnitude of the offset power value is smaller as the power purchase price is higher.

It should be noted that the number of information items included in the price information used for determining the price information index α may be one or more. For example, the price information may include the information indicating the above described power purchase price and the information indicating the system depreciation cost. Moreover, a method for determining an offset power value is not limited to a method using the price information index. For example, the offset power value determination unit 130*c* may determine, as an offset power value, a power value whose magnitude is smaller as the value of the price indicating the price information is larger.

As described above, the storage battery control apparatus 100*c* determines, as an offset power value, a power value whose magnitude is smaller as the value of the price indicating the price information obtained by the price information obtainment unit 170 is larger. In other words, the offset power value determination unit 130*c* determines the most appropriate offset power value by considering a price obtained by providing the supply and demand control service, and a utility rate charged according to power to be charged from the grid to the storage battery 20 at the time of charge. With this, revenue from the supply and demand regulation can be increased.

Furthermore, when the offset power value is small, the charge and discharge power amount can be reduced when the supply and demand control service is provided. Therefore, degradation of the storage power 20 can be reduced.

Modification

It should be noted that although the storage battery control apparatus according to embodiments has been described. However, the present invention is not limited only to these embodiments. The following cases are also included in the present invention.

(1) Each of the aforementioned apparatuses can be, specifically, realized by a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operation according to the computer program. Here, the computer program is configured by combining plural instruction codes indicating the instructions for the computer.

(2) A part or all of the constituent elements constituting the respective apparatuses may be configured from a single System LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM. The System-LSI achieves its function when the microprocessor loads a program from the ROM to the RAM, and performs an operation such as calculation according to the loaded computer program.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its function through the microprocessor's operation according to the computer program. The IC card of the module may also be implemented to be tamper-resistant.

(4) The present invention may be realized according to the aforementioned method. Moreover, the present invention may be a computer program for realizing the previously illustrated method, using a computer, and may also be a digital signal including the computer program.

Furthermore, the present invention may be realized by storing the computer program or digital signal in a computer readable recording medium such as flexible disc, a hard disk, a CD-ROM, an MO, a DVD, a DVD-ROM, a DVD-RAM, BD (Blu-ray (registered trademark) Disc), and a semiconductor memory. Furthermore, the present invention also includes the digital signal stored in these recording media.

Furthermore, the present invention may also be realized by the transmission of the aforementioned computer program or digital signal via a telecommunication line, a wireless or wired communication line, a network represented by the Internet, a data broadcast, and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer program is also made possible.

(5) It is possible to combine each of the embodiments and the modification.

As described above, the storage battery control apparatus according to embodiments has been described. However, the present invention is not limited only to these embodiments. Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

INDUSTRIAL APPLICABILITY

A storage battery control apparatus according to the present invention is effective as a control apparatus of a storage battery to be used in controlling a supply and demand balance of the grid.

REFERENCE SIGNS LIST

1 Supply and demand control system
2 Power exchange market
3 Power system operator
10 Bidding system
20 Storage battery
30 DC/AC converter
100, 100*a*, 100*b*, 100*c* Storage battery control apparatus
110*a*, 110*b* Storage battery state detection unit
120 Control capability determination unit
130, 130*c* Offset power value determination unit
140 Adjustment instruction value obtainment unit
150*a*, 150*b* Charge and discharge control unit
160 Corrected power value determination unit
901 Adjustment instruction power value
902, 903, 904 First power value
911, 912, 913, 914 Graph
915, 916 Threshold
917 Price information index lower

The invention claimed is:

1. A storage battery control apparatus which controls charge and discharge of the storage battery to adjust power supply and demand of a grid in a supply and demand control period, the storage battery control apparatus comprising:

a first obtainer that obtains a remaining state of charge (SOC) which is an SOC of the storage battery at a start of the supply and demand control period;

an offset power value determiner that determines an offset power value which is a power value indicating charge or discharge and is a reference of the charge and discharge of the storage battery in the supply and demand control period, the offset power value being determined using a difference between the remaining SOC and a target SOC, and the target SOC being (i) a target value of the SOC of the storage battery at an end of the supply and demand control period and (ii) a fixed value less than 100% of a capacity of the storage battery;

a second obtainer that obtains an adjustment instruction value which is an instruction value of the charge and discharge of the storage battery and indicates a change amount of a power value from a predetermined reference power value; and a charge and discharge controller that performs control of discharging power from the storage battery to the grid or charging power from the grid to the storage battery, the power having a magnitude of a first power value that is a power value obtained by adding the offset power value to an adjustment instruction power value that is a power value indicated by the adjustment instruction value.

2. The storage battery control apparatus according to claim 1, wherein in a case where the adjustment instruction power value is a positive value when the adjustment instruction value indicates a power supply instruction to the grid, and the adjustment instruction power value is a negative value when the adjustment instruction value indicates a power consumption instruction in the grid:

the offset power value determiner determines, as the offset power value, a power value having a polarity identical to the polarity of a power amount obtained by subtracting the target SOC from the remaining SOC; and the charge and discharge controller performs control of discharging power having a magnitude of the first power value from the storage battery to the grid when the first power value is a positive value, and performs control of charging power having a magnitude of the first power value from the grid to the storage battery when the first power value is a negative value.

3. The storage battery control apparatus according to claim 1, wherein the offset power value determiner determines the offset power value, using a power value obtained by dividing a power amount obtained by subtracting the target SOC from the remaining SOC, by a duration of the supply and demand control period.

4. The storage battery control apparatus according to claim 1, further comprising a memory that stores power loss information which is information related to a power loss generated when, in the supply and demand control period, the storage battery is discharged to the grid or the storage battery is charged from the grid, wherein the offset power value determiner further determines the offset power value using a power amount corresponding to the power loss indicated by the power loss information.

5. The storage battery control apparatus according to claim 1, wherein the second obtainer obtains the adjustment instruction value at every predetermined period in the supply and demand control period.

6. The storage battery control apparatus according to claim 5, wherein the first obtainer further obtains the SOC of the storage battery at the every predetermined period:

the storage battery control apparatus further includes a corrected power value determiner that compares the SOC of the storage battery obtained at the every predetermined period with the target SOC, and then determines a corrected power value which is a power value of acceptable error range in the adjustment instruction power value and a power value for reducing a difference of a power amount between the SOC obtained at the every predetermined period and the target SOC; and the charge and discharge controller performs, at the every predetermined period, control of discharging power from the storage battery to the grid or charging power from the grid to the storage battery, the power having a magnitude of the first power value obtained by adding the offset power value to the adjustment instruction power value and by further adding the corrected power value.

7. The storage battery control apparatus according to claim 6, wherein in a case where the adjustment instruction power value is a positive value when the adjustment instruction value indicates a power supply instruction to the grid, and the adjustment instruction power value is a negative value when the adjustment instruction value indicates a power consumption instruction in the grid:

the corrected power value determiner determines, as the corrected power value, a power value having a polarity identical to the polarity of a power amount obtained by subtracting the target SOC from the SOC of the storage battery obtained at the every predetermined period; and the charge and discharge controller performs control of discharging power having a magnitude of the first power value from the storage battery to the grid when the first power value is a positive value, and performs control of charging power having a magnitude of the first power value from the grid to the storage battery when the first power value is a negative value.

8. The storage battery control apparatus according to claim 1, further comprising a control capability determiner that determines a control capability which is largest power of the storage battery and is used in the charge and discharge of the storage battery in the supply and demand control period, wherein the control capability determiner:

determines the control capability by setting, as an upper limit, power obtained by subtracting the magnitude of the offset power value from largest power that is dischargeable from the storage battery to the grid, when the offset power value indicates discharge from the storage battery; and determines the control capability by setting, as an upper limit, power obtained by subtracting the magnitude of the offset power value from largest power that is chargeable from the grid to the storage battery, when the offset power value indicates charge to the storage battery.

9. The storage battery control apparatus according to claim 1, further comprising an SOC predictor that predicts a difference of the SOC of the storage battery at the end of the supply and demand control period, from the SOC of the storage battery at the start of the supply and demand control period, using a previous adjustment instruction value obtained in a previous supply and demand control period, wherein the offset power value determiner further determines the offset power value using the difference of the SOC predicted by the SOC predictor.

10. The storage battery control apparatus according to claim 1, further comprising a price information obtainer that obtains price information that is information related to benefit by performing the charge and discharge of the storage battery in the supply and demand control period, wherein the offset power value determiner determines, as the offset power value, a power value that is smaller as the value of the price indicated by the price information is larger.

11. The storage battery control apparatus according to claim 1, wherein the first obtainer obtains the adjustment instruction value transmitted from a power system operation apparatus which operates the grid.

12. The storage battery control apparatus according to claim 1, further comprising an instruction value determiner that measures a frequency of an AC current of the grid and then determines the adjustment instruction value according to the frequency, wherein the first obtainer obtains the adjustment instruction value from the instruction value determiner.

13. The storage battery control apparatus according to claim 1, wherein the remaining SOC is an actually measured value or an estimated value of the SOC of the storage battery at the start of the supply and demand control period.

14. A storage battery control method for controlling charge and discharge of the storage battery to adjust power supply and demand of a grid in a supply and demand control period, the storage battery control method comprising:

obtaining a remaining state of charge (SOC) which is an SOC of the storage battery at a start of the supply and demand control period;

determining an offset power value which is a power value indicating charge or discharge and is a reference of the charge and discharge of the storage battery in the supply and demand control period, the offset power value being determined using a difference between the remaining SOC and a target SOC, and the target SOC being (i) a target value of the SOC of the storage battery at an end of the supply and demand control period and (ii) a fixed value less than 100% of a capacity of the storage battery;

obtaining an adjustment instruction value which is an instruction value of the charge and discharge of the storage battery and indicates a change amount of a power value from a predetermined reference power value; and performing control of discharging power from the storage battery to the grid or charging power from the grid to the storage battery, the power having a magnitude of a first power value that is a power value obtained by adding the offset power value to an adjustment instruction power value that is a power value indicated by the adjustment instruction value.

15. A storage battery system comprising:

the storage battery control apparatus according to claim 1; and the storage battery.

16. The storage battery control apparatus according to claim 1, wherein the target SOC is at or around 50% of the capacity of the storage battery, and the target SOC is a fixed value determined according to a ratio of average charge and discharge loss of the storage battery.

* * * * *